FREQUENCY MULTIPLICATION

Filed May 6, 1959

INVENTOR.
MARVIN A. STERN
BY Richard G. Stahr
ATTORNEY

United States Patent Office 3,066,196
Patented Nov. 27, 1962

3,066,196
FREQUENCY MULTIPLICATION

Marvin A. Stern, Rochester, N.Y., assignor to General Dynamics Corporation, Rochester, N.Y., a corporation of Delaware Filed May 6, 1959, Ser. No. 811,430
8 Claims. (Cl. 179—100.2)

Figure 1:
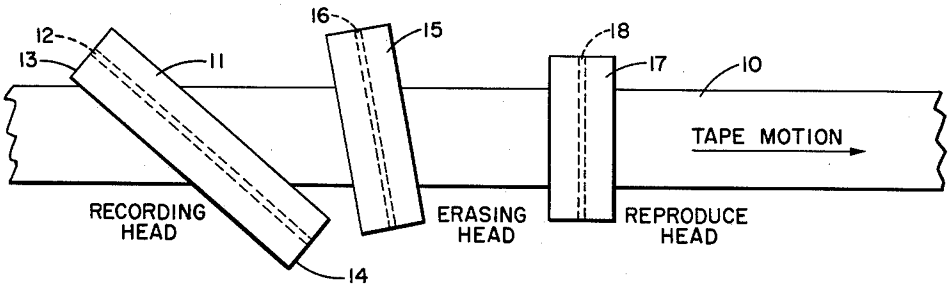

The present invention relates to frequency multiplication devices and, more specifically, to a device for and method of multiplying the frequency of a recorded signal waveform.

In the field of acoustical research, it is frequently necessary to perform a frequency spectrum analysis upon signal waveforms which may represent in graphical form various sounds, such as speech, for the purpose of determining the various frequency components present as well as relative amplitudes in relation to time.

In early prior art methods, the signal waveform to be analyzed was recorded upon a recording medium suitable to be scanned by a playback gap and was replayed repeatedly during which time a wave filter was incrementally tuned across the frequency spectrum present. This method proved unsatisfactory in that the wave analysis was not procured in real time and the necessity of repeatedly replaying the signal waveform while a filter was incrementally tuned to be responsive to successive frequencies proved time consuming.

So that sweep filters, having short time constants, may be employed for the purpose of separating the several frequency components present in a signal waveform, it was found necessary to multiply the frequency of the signal waveform to be analyzed to a frequency high enough to be compatible with sweep filters of the type which may be continuously tuned across the frequency spectrum present. Prior art devices for accomplishing this frequency multiplication comprised means for scanning the record signal waveform with a playback gap at a relative speed much higher than the recording speed. This was done through the medium of passing the recorded signal waveform over a revolving playback head having a plurality of playback gaps or by wrapping a magnetic tape upon which the signal waveform was recorded around the periphery of a drum and revolving it past a stationary head having a single playback gap at a speed much greater than the recording speed.

These two methods, while they accomplish the required frequency multiplication of a recorded signal waveform, proved objectionable because of the mechanically moving parts which proved difficult to maintain in proper adjustment and caused excessive recording medium wear.

It is, accordingly, an object of this invention to provide an improved frequency multiplication device.

It is another object of this invention to provide an improved device for and method of multiplying the frequency of a recorded signal waveform while scanning the recorded waveform at recording speed.

In accordance with this invention, a signal waveform may be recorded upon a recording medium in the form of spaced, incremental areas which are angularly displaced relative to the transverse axes of the magnetization areas each of which is produced by the same recording signal level and scanned at recording speed with a playback gap angularly displaced relative to both the incremental areas and the transverse axes of the magnetization areas whereby the frequency multiplication factor is a function of the angular displacement of the playback gap relative to both areas.

Figure 2:
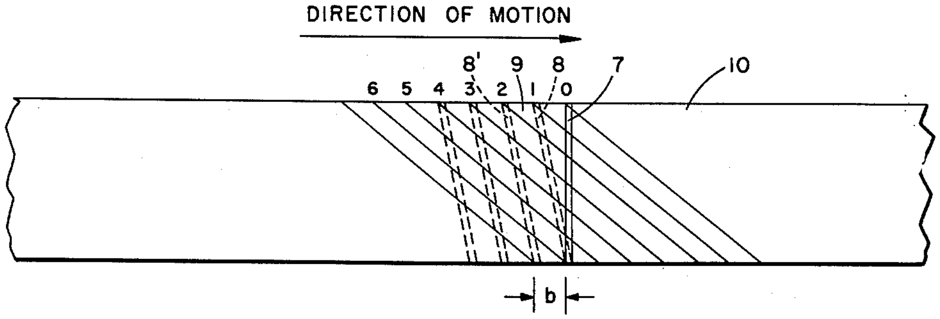
Figure 3:
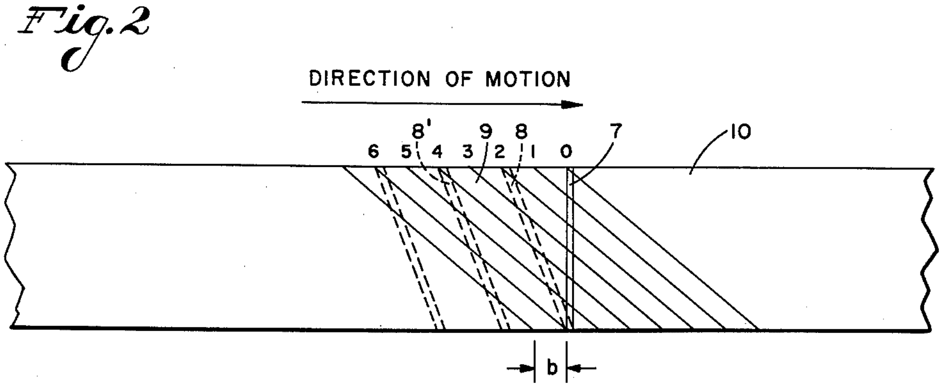
Figure 4:
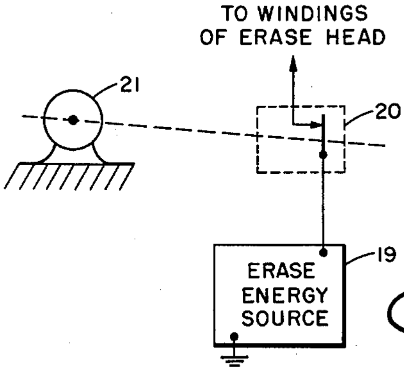

For a better understanding of the present invention, together with further objects, advantages and features thereof, reference is made to the following description and accompanying drawings, in which:

FIGURE 1 illustrates diagrammatically one representative disposition of the elements of a magnetic recording-producing system embodying the principles of my invention;

FIGURES 2 and 3 graphically illustrate results obtainable with apparatus such as that shown in FIGURE 1; and FIGURE 4 illustrates diagrammatically one example of apparatus useful in the practice of this invention.

Without intending or inferring that the present invention be limited thereto, the following description thereof will be in regard to an application involving a signal waveform recorded upon a magnetic tape.

So that a signal waveform may be recorded upon the recording medium, in this instance a magnetic tape, in the form of spaced, incremental areas which are angularly disposed relative to the transverse axes of the magnetization areas, each of which is produced by the same recording signal level, a conventional recording head with the associated recording gap disposed diagonally of the direction of magnetic tape motion, as is diagrammatically illustrated in FIGURE 1, may be employed. Here, a recording head 11 and the associated recording gap 12 are angularly disposed relative to the direction of tape motion. Since with conventional recording heads, the lines of magnetic flux appearing across the recording gap 12 from the end 13 to the end 14 of recording head 11 are produced by the same portion of the recording signal at any given instant, it may be said that the magnetization area which is produced by the same recording signal level is that area upon the recording medium as defined by the edges of the recording gap and the edges of the magnetic tape.

Referring now to FIGURES 2 and 3, where like elements have been given like characters of reference, the solid diagonal lines, numbered 0 to 6, inclusive, graphically represent the maximums in magnitude of the respective cycles of a recorded signal waveform, the space therebetween representing the transition from maximum to maximum, as would be produced by a recording head and associated recording gap angularly disposed relative to the direction of motion of the magnetic tape as is diagrammatically illustrated by recording head 11 and recording gap 12 of FIGURE 1. For example, should the recorded signal waveform be sinusoidal in character, the space between the solid diagonal lines numbered 0 and 1 would represent one cycle of a sine wave, the space between the solid diagonal lines numbered 1 and 2 would represent another cycle, and so on. It is to be specifically understood, however, that any complex signal waveform may be thus recorded, the sine wave illustration being used only for the purpose of more clearly demonstrating the graphical illustration of FIGURES 2 and 3.

As the magnetization area produced by a recording signal level may be said to be that area upon the recording medium as defined by the edges of the recording gap and the edges of the tape and since the solid diagonal lines numbered 0–6, inclusive, of FIGURES 2 and 3 graphically illustrate the maximums in magnitude of the respective cycles of a recorded signal waveform, having been produced by the same recording signal level, the transverse axes of the magnetization areas, each of which is produced by the same recording signal level energizing the recording gap of a recording head, are coincident therewith.

In order to provide spaced, incremental areas of the recorded signal waveform which are angularly disposed relative to the transverse axes of the magnetization areas which are produced by the same recording signal level, means is provided for erasing predetermined portions of the signals recorded at gap 12. This means may comprise a conventional erase head 15 with its associated erase gap 16 disposed diagonally of the direction of the magnetic tape motion but at a different angle than that at which the recording head 11 and its associated recording gap 12 are located, as is diagrammatically illustrated in FIGURE 1 by the dashed lines. The remaining spaced, incremental signal areas lie between the closely spaced diagonal dashed lines of FIGURES 2 and 3 where the relatively narrow areas 8 bounded by certain of the dashed lines represent the signal-bearing incremental areas while the larger remaining areas 9 represent erased areas. To accomplish this, the erase energy which energizes the erase head 15 may be synchronized with the recording speed in such a manner that the erase energizing current is interrupted at periodic intervals so spaced that the beginning of one of the spaced, incremental areas 8 is coincident with the end of the next preceding one, as indicated in FIGURES 2 and 3. It will be noted that the spaced, incremental areas 8 are angularly disposed relative to the axes of the magnetization areas produced by the same recording signal level and that the beginning of each incremental area is coincident with the ending of the next preceding one.

As the present invention is concerned only with any suitable provision for the interruption of the erase energy at periodic intervals which are spaced, in relation to the recording speed, in such a manner that the spaced, incremental areas have the coincidence as previously brought out, and not with the precise structure for accomplishing this result, only one proposed method will be indicated and is shown diagrammatically in FIGURE 4. A conventional source of erase energy, which is an integral part of any tape recording system and, therefore, forms no part of this invention, is illustrated in block form by reference numeral 19. Interposed between the erase head and the source of erase energy 19 may be a cam-operated switching arrangement of any conventional design, indicated by reference numeral 20. This cam-operated switching arrangement may be operated from the capstan drive motor 21 through a mechanical linkage arrangement which would provide for the periodic operation of the movable contact of switch 20 at such times, in relation to the recording speed, as to interrupt the erase current in a manner to provide the spaced, incremental areas of recorded signal waveform which are spaced in accordance with the requirements as previously outlined.

As the magnetic tape continues in its normal direction of motion, as indicated, the spaced, incremental areas 8 are scanned, at recording speed, with a conventional playback head 17 and the associated playback gap 18, FIGURE 1, and indicated graphically in FIGURES 2 and 3 as the area 7 between the vertical solid lines, which are disposed transversely of the recorded increments 8.

Referring to the figures, FIGURE 2 will be considered first where one of the increments, reference numeral 8, is entering the playback gap 7. It will be noted that as increment 8 is scanned by playback gap 7 as tape 10 continues in its linear direction, cycles 1, 2, 3, 4 and 5 will be scanned. As the tape continues in its motion to such a point where increment 8′ is scanned thereby, it will be noted that cycles 2, 3, 4, 5 and 6 will be scanned at this time. From this it will be noted that as the tape is moved past the playback gap 7, each of the cycles of the recorded waveform is scanned five times with each increment and that as one of the cycles is no longer scanned another one is picked up at its beginning. This has the effect of a rotating head which scans each of the cycles several different times as the tape is passed across and as one of the cycles passes beyond the playback head another cycle is added at the beginning and is itself scanned a number of times before it passes beyond the area of the playback gap. It will be noted that distance *b* represents the distance which would normally be required to scan one cycle of the signal waveform were the recording head disposed normal to the direction of motion of tape 10. However, five different cycles are scanned during this period of time, thereby affording a frequency multiplication factor of five.

Considering next FIGURE 3, in which the angle of displacement of the playback gap 7 relative to the several recorded increments is greater than that shown in FIGURE 2, it will be noted that only four cycles of the recorded waveform are included with each increment. That is, in the case of increment 8, only cycles 2, 3 4 and 5 are included in this increment. Similarly, only four cycles are included with each of the other increments, as shown. Unlike the case of FIGURE 2, during the time of distance *b*, only two of the cycles of the recorded signal waveform are scanned, thereby affording a multiplication factor of two. From this, it may be seen that the frequency multiplication factor of the method of this invention is a function of the angular displacement of the playback gap relative to the discrete increments.

In practice, of course, the recorded signal wave will not be the simple sine wave described above, but will be a complex wave having a plurality of frequency components. The fact that playback gap 18 is angularly displaced with respect to the direction of magnetization of the recorded signal waveform results in a certain atenuation of the reproduced signal, which attenuation is related to the respective recorded wavelengths of the various frequency components of the recorded signal waveform in accordance with the following formula, shown on page 75 of "Magnetic Recording Techniques" by W. Earl Stewart, published by McGraw-Hill in 1958:

$$\text{db loss} = 20 \log_{10} \frac{\sin\left(\frac{\pi W \tan\theta}{\lambda}\right)}{\frac{\pi W \tan\theta}{\lambda}}$$

where W is equal to the effective track width of playback gap 18 with respect to each of the incremental areas, $\theta$ is the angle between playback gap 18 and the direction of magnetization of the recorded signal waveform and $\lambda$ is the recorded wavelength of any frequency component of the recorded signal waveform.

It will be seen from FIGS. 2 and 3 that the effective playback width W (the small portion of an incremental area in cooperative relationship with playback gap 18 at any given time) is extremely small, such as in the order of 5 mils or so, for example. Also, the relatively higher attenuation of the high frequency components of the complex signal may be made quite small by utilizing a sufficiently high tape speed. In addition, high frequency preemphasis may be used to compensate for the relatively higher attenuation of the high frequency components, as is well known in the art, to obtain a flat frequency response.

In playing back a recorded signal waveform, the waveform will be reproduced successively a number of times. In each successive reproduction of the waveform a small portion at the beginning thereof will be eliminated and a new small portion at the end thereof will be added. The extent of each reproduced waveform is, of course, the amount of recorded signal contained in each incremental area. Therefore, the lowest frequency component which may be reproduced is one which includes one complete wavelength in an incremental area. With this limitation, the reproduced signal obtained from the scanning of each incremental area will include one or more cycles of each frequency component of the recorded signal waveform. The analysis of the frequency components in each of the successive reproduced signals obtained from scanning successive incremental areas will permit the frequency components of the original recorded signal waveform to be derived.

While this method has been shown and described in regard to the use of a magnetic tape as a recording medium with the playback gap disposed normal thereto and the recording and erase gaps disposed transverse thereof at different relative angles, it is to be specifically understood that other angular displacements may be employed so long that the relative angular displacements are maintained.

Similarly, the erase gap may be omitted if provision is made for a recording medium having only narrow strips of magnetizable material disposed at the same angular displacement relationship with the record head gap and the playback head gap.

In addition, the method as hereinabove described is not limited to magnetic tapes but may also be applied to magnetic drums or disc recording mediums. In the case of a disc recording medium, however, and using only linear gaps, it is of necessity that the several discrete segments have a certain curvature, as determined by the relative angular displacements of the several gaps in the discrete increments, to afford a linear playback.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. Apparatus for multiplying the frequency of a recorded signal waveform having a given direction of magnetization comprising means for recording a signal waveform in the form of distinct spaced incremental areas upon a recording medium, each of said incremental areas having a single substantial dimension which is angularly disposed relative to said given direction of magnetization, and reproducing means angularly disposed at an oblique angle relative to said incremental areas for sequentially scanning each respective incremental area, whereby the frequency multiplication factor is a function of the angular displacement of said reproducing means relative to said increments.

2. Apparatus for multiplying the frequency of a recorded signal waveform having a given direction of magnetization comprising recording means for recording a signal waveform upon a recording medium, means for reducing the recorded signal to the form of distinct spaced incremental areas each of which has a single substantial dimension which is angularly disposed relative to said given direction of magnetization, and reproducing means angularly disposed at an oblique angle relative to said incremental areas for sequentially scanning each respective incremental area, whereby the frequency multiplication factor is a function of the angular displacement of said reproducing means relative to the said increments.

3. The apparatus defined in claim 2, wherein said recording medium is a magnetic recording medium moving in a given direction, wherein said recording means includes a magnetic recording head having a gap disposed at a first given angle with respect to the direction of motion of said recording medium, wherein said reproducing means includes a magnetic reproduce head spaced from said recording head in the direction of motion of said recording medium and disposed at a second given angle with respect to the direction of motion of said recording medium, said second given angle being different from said first given angle, and wherein said means for reducing the recorded signal to the form of distinct spaced incremental areas includes a magnetic erase head having a gap located between said respective gaps of said recording head and disposed at a third given angle with respect to said direction of motion of said recording medium, said third given angle being intermediate said first and second given angles.

4. The apparatus defined in claim 3, wherein said second given angle is larger than said first given angle.

5. Apparatus for multiplying the frequency of a recorded signal waveform having a given direction of magnetization comprising means for recording a signal waveform in the form of distinct spaced incremental areas upon a recording medium, each of said incremental areas having a single substantial dimension which is angularly disposed relative to said given direction of magnetization, and reproducing means angularly disposed at an oblique angle relative to said incremental areas for sequentially scanning each respective incremental area at recording speed, whereby the frequency multiplication factor is a function of the angular displacement of said reproducing means relative to said increments.

6. Apparatus for multiplying the frequency of a recorded signal waveform having a given direction of magnetization comprising recording means for recording a signal waveform upon a recording medium, means for reducing the recorded signal to the form of distinct spaced incremental areas each of which has a single substantial dimension which is angularly disposed relative to said given direction of magnetization, and reproducing means angularly disposed at an oblique angle relative to said incremental areas for sequentially scanning each respective incremental area at recording speed, whereby the frequency multiplication factor is a function of the angular displacement of said reproducing means relative to the said increments.

7. Apparatus for multiplying the frequency of a recorded signal waveform having a given direction of magnetization comprising recording means for recording a signal waveform upon a magnetic tape, means for reducing the recorded signal to the form of distinct spaced incremental areas each of which has a single substantial dimension which is angularly disposed relative to said given direction of magnetization, and reproducing means angularly disposed at an oblique angle relative to said incremental areas for sequentially scanning each respective incremental area, whereby the frequency multiplication factor is a function of the angular displacement of said reproducing means relative to the said increments.

8. Apparatus for multiplying the frequency of a recorded signal waveform having a given direction of magnetization comprising recording means for recording a signal waveform upon a magnetic tape, means for reducing the recorded signal to the form of distinct spaced incremental areas each of which has a single substantial dimension which is angularly disposed relative to said given direction of magnetization, and reproducing means angularly disposed at an oblique angle relative to said incremental areas for sequentially scanning each respective incremental area at recording speed, whereby the frequency multiplication factor is a function of the angular displacement of said reproducing means relative to the said increments.

References Cited in the file of this patent

UNITED STATES PATENTS

| | | |
|---|---|---|
| 2,531,642 | Potter | Nov. 28, 1950 |
| 2,712,572 | Roberts | July 5, 1955 |
| 2,803,988 | Ranger | Aug. 27, 1957 |
| 2,832,839 | Muffly | Apr. 29, 1958 |
| 2,938,962 | Konins et al. | May 31, 1960 |